(12) United States Patent
Apfel et al.

(10) Patent No.: US 6,510,453 B1
(45) Date of Patent: Jan. 21, 2003

(54) SYSTEM AND METHOD FOR CREATING AND INSERTING MULTIPLE DATA FRAGMENTS INTO AN ELECTRONIC MAIL MESSAGE

(75) Inventors: Darren Apfel, Redmond, WA (US); James N. Helfrich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/258,672

(22) Filed: Feb. 26, 1999

(51) Int. Cl.[7] .............................................. G06F 15/16
(52) U.S. Cl. ..................................................... 709/206
(58) Field of Search ................................. 709/206, 207

(56) References Cited

U.S. PATENT DOCUMENTS 5,604,853 A * 2/1997 Nagashima .................. 395/146
5,758,095 A * 5/1998 Albaum et al. .............. 395/202
5,956,681 A * 9/1999 Yamakita ..................... 704/260
6,091,835 A * 7/2000 Smithies et al. ............. 382/115
6,298,232 B1 * 10/2001 Martin et al. ................ 455/413

OTHER PUBLICATIONS

"About Microsoft Outlook", Screenshot, Microsoft Corporation, Copyright 1995–1998, Redmond, WA.

* cited by examiner

Primary Examiner—David Y. Eng
(74) Attorney, Agent, or Firm—Merchant & Gould

(57) ABSTRACT

A method for creating and inserting an electronic mail signature fragment into an electronic mail message during the creation of the electronic mail message is disclosed. A computer-readable medium on which is stored a program module for creating and inserting an electronic mail signature fragment into an electronic mail message during the creation of the electronic mail message is also disclosed.

22 Claims, 8 Drawing Sheets

FIG. 6

SYSTEM AND METHOD FOR CREATING AND INSERTING MULTIPLE DATA FRAGMENTS INTO AN ELECTRONIC MAIL MESSAGE

TECHNICAL BACKGROUND

The invention is directed to editing and inserting data into an electronic document, such as an electronic mail message. More specifically, the present invention allows a user to create, edit, and insert electronic mail signatures into electronic mail messages during composition of electronic mail messages.

BACKGROUND OF THE INVENTION

Electronic mail, or "e-mail," is becoming an increasingly common method of communication in today's computerized world. Messages are sent between coworkers, employers and employees, relatives, friends, and so on. A common element of an e-mail message is the "signature fragment", which typically comprises text and/or graphical data, such as a set of text lines that follow a user's name at the close of a message.

The signature fragment is used for various purposes, ranging from communicating business or contact information to humorous comments. Many times, a user of an electronic mail editing application will wish to have two different signature fragments, one for new messages and one for reply messages. For example, it is often desirable to have a complete listing of one's business contact information, including name, address, and telephone number, in the first electronic mail message sent to a client or associate. A recipient may then obtain all necessary information regarding a sender from a single message. However, including this same amount of information in every reply message received from the original recipient only increases the length of the message and the bandwidth required to deliver or retrieve the message. Instead, an abbreviated signature fragment may be desired for a reply message, such as the sender's initials.

A signature file appropriate for one electronic mail message may not be equally applicable in another. For example, an electronic mail message sent to a family member may include the signature, "Hugs and kisses," which would be inappropriate for a business e-mail. The prior art allows a user to create an e-mail signature fragment, but also requires that the electronic mail signature be specified prior to the creation of the message. That is, the same electronic mail signature fragment is inserted into each and every electronic mail message created by a user. This is cumbersome for a user that realizes his signature file is inappropriate for the recipient of the message currently being composed. A user who wishes to change an electronic mail signature fragment must delete the existing signature fragment, then retype a new one. This imposes a burden on the user and consumes additional time that may be devoted to more productive tasks.

Consequently, there is a need for determining whether an electronic mail message is a new message or a reply message and inserting an electronic mail signature fragment of the appropriate type into the message. There is a further need for an application that allows for a signature fragment to be replaced by another signature fragment selected from a list of signature fragments presented to the user during composition of an electronic mail message. These and other needs are addressed by the present invention.

SUMMARY OF THE INVENTION

The present invention supports the automated insertion of data into an electronic document based on an identifying characteristic of the electronic document. For the representative example of a electronic mail message, the present invention supports the insertion of an electronic mail signature fragment into an electronic mail message based on the context of the electronic mail message. If the electronic mail message represents a reply to a received message, then a signature fragment assigned to reply-type messages is inserted without manual intervention in a predetermined location within the electronic mail message. Alternatively, if the electronic mail message represents a newly composed message, then a signature fragment assigned to new-type messages is inserted without manual intervention into the predetermined location within the electronic mail message. The present invention also can support the automated insertion of a particular signature fragment within the electronic mail message based on the identity of the designated recipient for the message.

In general, the present invention can insert one of multiple signature fragments into a electronic mail message, typically at the close of the message, in response to identifying the context or type of the message. Based on this determination of the message type, a data set, such as a data string representing one of the signature fragments, is selected for insertion into the message. In turn, this data string can be inserted at a predetermined location within the message to complete an initial composition of the message.

The present invention supports the selection of a signature fragment and the subsequent insertion of that selected signature fragment in response to accessing an array of signature fragments during the composition of an electronic mail message. An original signature fragment can be inserted into the message during the initial composition of the message, typically based on the context of that message. If the user decides that this original signature fragment is not a desired signature fragment, then the user can use an input device, such as a mouse or pointing device, to generate a first input signal while a position indicator, such as a cursor, is positioned proximate to the original signature fragment. In response to this first input signal, the array of signature fragments is accessed and presented to the user as a list of signature fragments. The user can select one of the signature fragments from this list by using the input device to issue another input signal. This selection of one of the listed signature fragments results in the insertion of the selected signature fragment in place of the original signature fragment within the message. In this manner, a user may change electronic mail signatures "on the fly" when composing an electronic mail message.

More particularly described, a user can assign "default" signature fragments to typical types of electronic mail messages, such as reply messages and "new" messages. For example, the user may specify a particular signature fragment for each of the message types. In the alternative, the user has the flexibility of assigning the same signature fragment to both message types. When a user composes a new electronic mail message, the default signature fragment assigned to a new-type message is inserted without manual intervention into the message. Similarly, when a user replies to a received electronic mail, the default signature fragment assigned to a reply-type message is automatically inserted into the message. This insertion of the appropriate default signature fragment is completed in response to identifying the message type for the electronic message. For one aspect of the invention, unique identifiers for these new and reply default signature fragments can be stored in the registry of Microsoft's "WINDOWS" operating system so that they may be easily accessed by any document or program that is programmed to look in the registry for these keys.

A user can be presented with an option of changing the presently displayed signature fragment during composition of an electronic mail message. This edit capability is typically indicated to the user by displaying a "tool tip" when the position indicator is placed proximate to this signature fragment. A tool tip refers to an automated function that typically displays helpful text defining instructions for a possible user action or event. Activation of a tool tip can be completed by examining the electronic mail message for specific styles, such as an Email Signature style, associated with certain positions within the message. As an example, when a position indicator hovers over a signature fragment of the electronic mail message, styles associated with the signature are detected. This prompts the issuance of a representative tool tip: "Click the right mouse button to insert an e-mail signature." In turn, when the user clicks the right mouse button, a list of possible electronic mail signature fragments, called a signature context menu, is displayed on the display screen. A user can select a signature fragment from this list for insertion into the message, thereby replacing the original signature fragment with the selected signature fragment. This selected signature fragment is automatically inserted into the message, in place of the original signature fragment, by scanning the message text for field delimiters, and replacing all text between the delimiters with the selected signature text.

The signature fragments of the signature context list can be created by a user through the use of an electronic mail editing application. For example, signature creation and editing can be completed with Microsoft's "WORD" word processing program. As each signature fragment is created, it can be stored in the AutoTextList under a specific Auto-Text name. The AutoText name indexes the various signatures and allows the user to easily recognize the content of each signature. A newly created signature fragment can be identified by the user as a default signature for a selected type of electronic mail message, such a default new or reply signature fragment.

The present invention also can support the linking of signature files and recipients. That is, when a particular recipient is specified for an electronic mail message, a signature designated for that recipient will be inserted into the body of the message rather than the default new or reply signature fragments. This allows for greater personalization of e-mail messages without the expenditure of additional effort by the user. To support this feature of the invention, a table of all previous recipients, called the association list, can be maintained within memory; this table typically comprises a set of entries, a unique recipient identifier and the electronic mail signature fragment associated with that recipient.

For example, in response to creating the electronic mail message addressed to a particular recipient, the association list is searched for the recipient's identifier. In the event that this table contains an entry for the recipient's identifier, the corresponding electronic mail signature is inserted into the electronic mail message at a predetermined location In the event that the recipients list does not include an entry corresponding to the recipient of the message and, if a non-default signature fragment is chosen for that recipient, then a new table entry can be created for that recipient.

To enhance performance of this function, the number of names or identifiers in the association list is typically limited to a manageable number. The association list can be chronologically organized; as a name is used, that name is moved to the top of the list. This ensures that the most recent e-mail recipients stay near the top of the association list. If the list grows too long, then it is automatically pruned from the bottom up until it reaches a manageable size. Therefore, when auto-pruning takes place, the oldest names are culled first. If multiple recipients are listed, then the default signature is used. If this signature is changed, the new signature is not associated with all recipients, but instead maintains any previous associations. However, if there is a single entry in the "To" field and multiple "CC" entries, then the association will be changed with respect to the entry in the "To" field only. Similarly, when composing a message with multiple "CC" recipients and a single "To" recipient, the signature associated with the "To" recipient will be used.

These and other advantages of the invention will become apparent when reading the specification, taken in conjunction with the claims.

BRIEF DESCRIPTION OF THE DRAWINGS

FIG. 6 is a screen display illustrating a signature context list in accordance with an exemplary embodiment of the present invention.

DETAILED DESCRIPTION OF EXEMPLARY EMBODIMENTS

Figure 1:
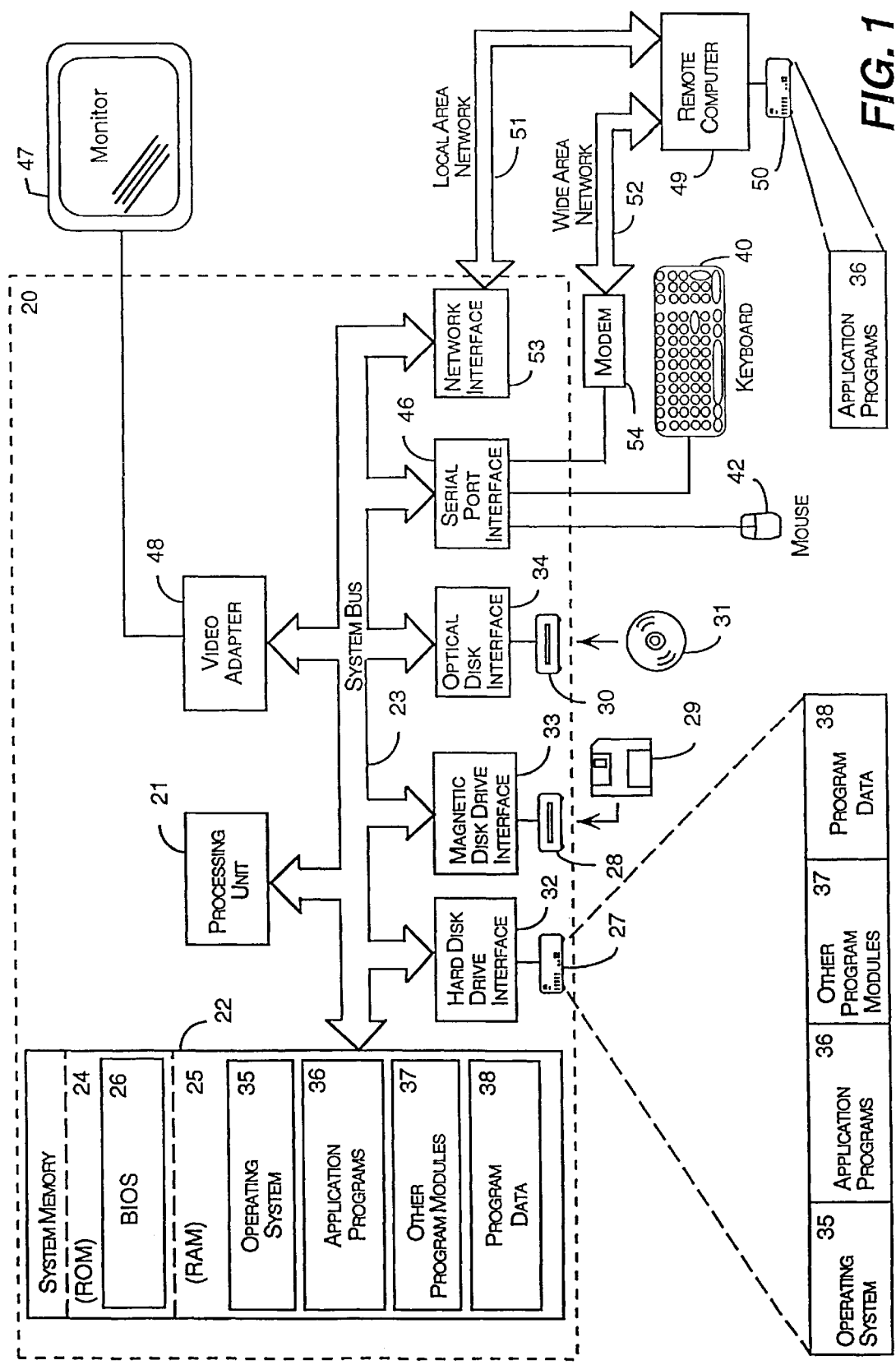
FIG. 1 is a block diagram of a personal computer that provides an exemplary operating environment for an exemplary embodiment of the present invention.

The present invention is directed to the automated insertion of one of multiple possible data candidates into an electronic document based on an identifying characteristic of that document. In response to identifying the context of the electronic document, one of the possible data candidates can be selected in accordance with that identifying characteristic of the electronic document. The selected data candidate is then placed within the electronic document, typically at a predetermined location within the body of the document.

For example, in a representative embodiment, an electronic mail signature can be inserted into an electronic mail message without manual intervention, based on the context of that message. In an exemplary embodiment, the invention is incorporated into an electronic mail editor, such as Microsoft's "WORD" OR "OUTLOOK EXPRESS." The "WORD" and "OUTLOOK EXPRESS" programs are produced and distributed by Microsoft Corporation of Redmond, Washington. Briefly described, the "WORD" application is a word processing and electronic mail editing program, and the "OUTLOOK EXPRESS" application is an electronic mail program that allows a user to send, receive, and manipulate electronic mail across the Internet, an intranet, a LAN, or similar architecture.

Oftentimes, a user of an electronic mail editor will desire to send electronic mail to multiple classes of recipients. These classes may know the user in different capacities, such as friends, family members, and coworkers. Since each class of recipients bears a differing degree of familiarity to the user, different closing information may be used for each electronic mail message. This closing information is colloquially referred to as a "signature file" or "signature fragment." These two terms are used interchangeably throughout this application; however, the term "signature file" should not be understood to mean a separate file stored on a computer, but instead simply the closing lines of an electronic mail message, as the term is typically used by one skilled in the art. Signature fragments are typically personalized lines of text that convey specific information, depending on the recipient. For example, the following may be used as a signature fragment in an electronic mail message sent from an attorney to a client:

John. Q. Attorney
Jones & Askew, LLP
Patent, Copyright, Trademark, and Related Litigation
*This information may be confidential and subject to attorney-client privilege*

However, this signature fragment may not be desired in an electronic mail message sent from the same attorney to a family member. Instead, a more personal close to the message may be desired:

Best, John
(555) 555-1212

Similarly, different signature fragments may be used with newly initiated electronic mail messages than with messages intended as a reply to an electronic mail message received by the user. The capabilities of the present invention, specifically the electronic mail signature creation and insertion capabilities, will be described in greater detail herein below with respect to FIGS. 1–7, wherein like elements are represented by like numerals throughout the several figures.

Now turning to FIG. 1, an exemplary operating environment in accordance with an exemplary embodiment of the present invention is now described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an electronic mail editing program 37, and program data 38. A user may enter commands and information into the personal computer 20 through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

FIGS. 2–7 illustrate screen displays that depict creating, editing, and inserting electronic mail signatures into an electronic mail message as well as flowcharts describing these processes. The electronic mail signature is stored as a signature fragment, which is in turn automatically inserted into new or reply electronic mail messages, based on the context of the message. The process is further operative to allow a user to manually change an automatically inserted signature while composing the electronic mail message, without forcing the user to completely retype the desired signature fragment.

Figure 2:
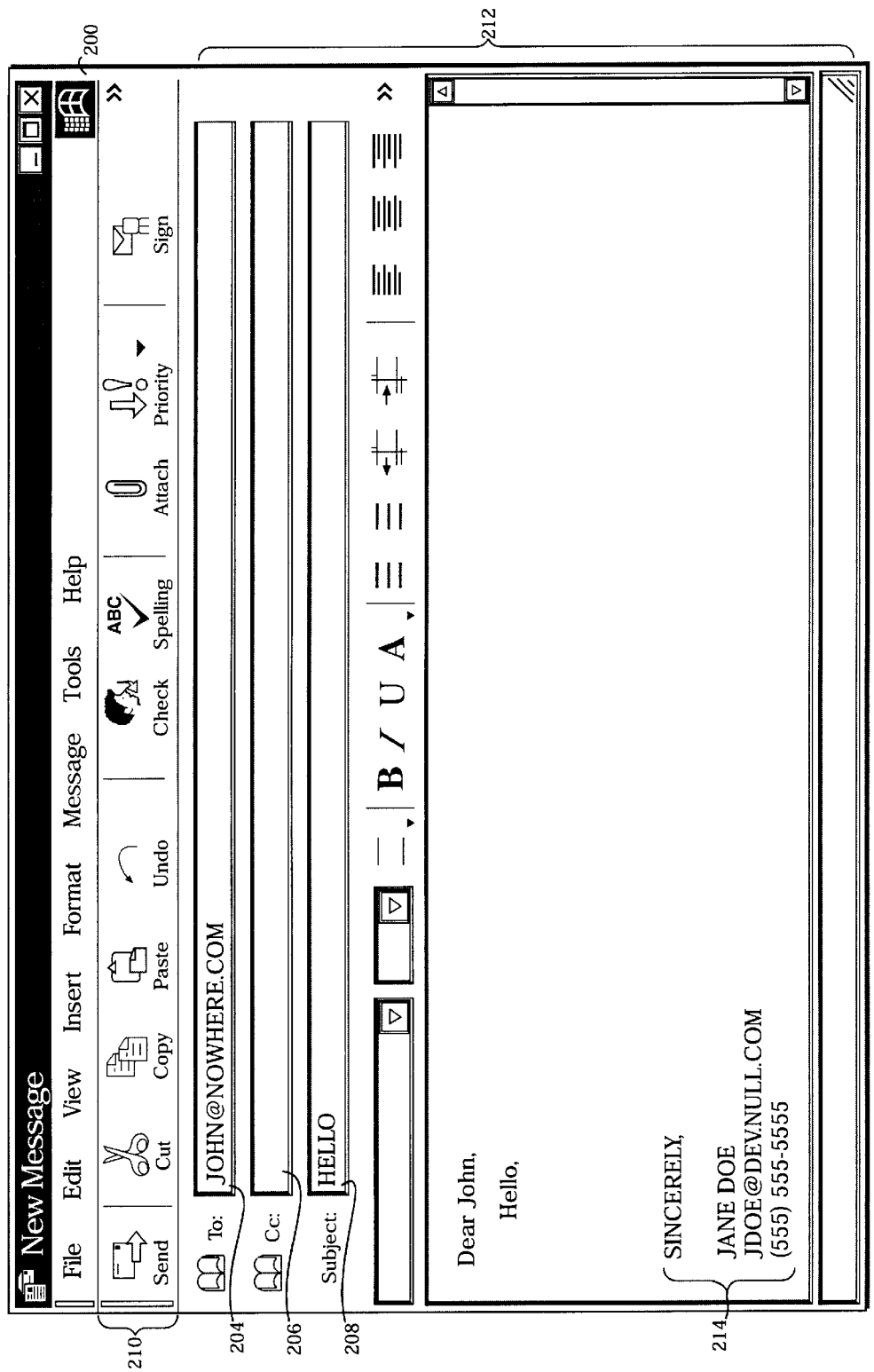
FIG. 2 is a screen display illustrating a typical electronic mail message creation screen.

FIG. 2 depicts a typical electronic mail creation application window 200, as known in the prior art. From this window 200, a user may create and compose electronic mail messages 212. Electronic mail messages 212 have several standard components. The body of the message 202 contains the textual content and information that a user desires to transmit. In the event that an electronic mail creation application provides for inserting a signature fragment 214 into an electronic mail message 212, the signature fragment is typically inserted as text at the end of the body 202.

A typical electronic mail message also contains a "TO" field 204. The name, electronic mail address, or other unique identifier of the recipient of the electronic mail message is entered in the to field 204. A conventional electronic mail creation application allows a user to save a recipient's electronic mail address under an alias to avoid forcing the user to repeatedly type the entire address. For example, the electronic mail address "johndoe@mailbox.domain.com" might be saved by a user of an electronic mail creation application 37 as "John." The application 37 is typically then operative to cross-reference the alias "John" in the to field 204 with a table of addresses, and route the electronic mail message to the proper electronic mail address.

Similarly, a typical electronic mail message also includes a "CC" field 206. The "CC" field also accepts electronic mail addresses or their aliases. As with the "TO" field 204, recipients listed in the "CC" field 206 are sent a copy of the electronic mail message 212. From an application standpoint, recipients in the "TO" field 204 and the "CC" field 206 are handled identically; both are sent the same electronic mail message. The "CC" field 206 is typically used in the manner that a carbon copy of a paper memorandum is used. That is, recipients are entered in the "CC" field 206 rather than the to field 204 because the user of the electronic mail creation application 37 wishes them to be aware of the contents of the message, although it may not be directed to them. Ultimately, the use of the "TO" field 204 versus the "CC" field 206 is a matter of user choice.

Electronic mail messages 212 also typically contain a subject field 208. The subject field 208 is typically used in a manner similar to the "Re:" line on a paper memorandum; that is, it serves as a one-line summary of the contents of an electronic mail message 212.

Data is entered in the "TO" field 204, the "CC" field 206, the subject field 208, and the body 202 through the use of an input device such as a keyboard 40 or mouse 42. Alternate input devices exist and are commonly used; for example, a microphone may be used along with a voice recognition program to dictate the contents of an electronic mail message 212. These examples should be understood to be by way of illustration and not limitation; other alternative input devices may be used without departing from the terms of the specification.

Figure 3:
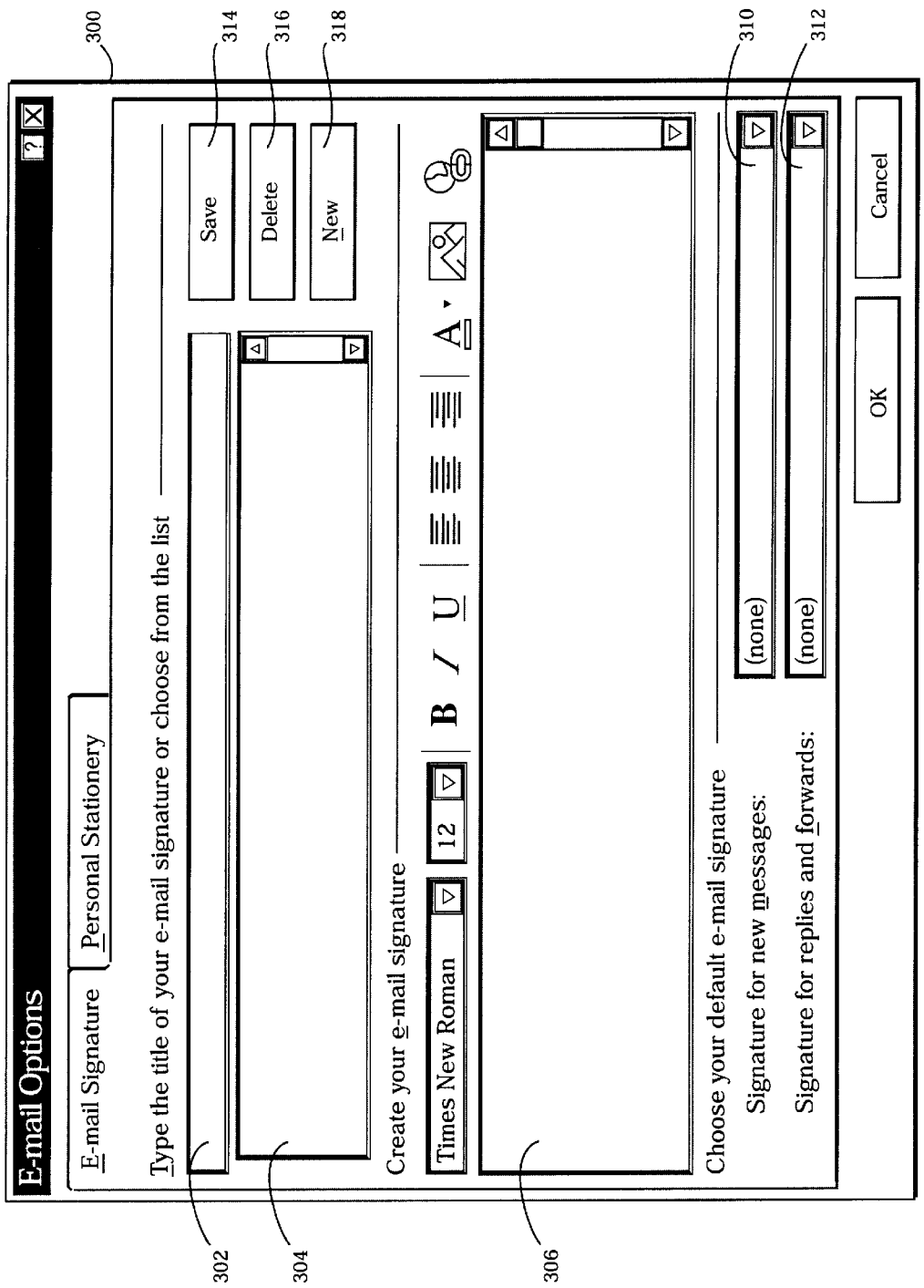
FIG. 3 is a screen display illustrating an electronic mail signature creation/editing dialog in accordance with an exemplary embodiment of the present invention.

Turning now to FIG. 3, the process of creating an electronic mail signature fragment will be discussed. FIG. 3 depicts an electronic mail signature creation dialog 300 in accordance with an exemplary embodiment of the present invention. The signature creation dialog 300 allows a user of the exemplary embodiment to create an electronic mail signature fragment 214, name the fragment, and store the fragment for later use in an electronic mail message 212. An exemplary embodiment, such as Microsoft's word processing and electronic mail editing program "WORD," allows a user to access the signature creation dialog 300 as a popup dialog from a context menu. Included as part of the electronic mail signature creation dialog 300 are the save button 314, the delete button 316, and the new button 318. Clicking the save button 314 will store the signature fragment 214 for later use. Clicking the delete button 316 removes the electronic mail signature fragment whose name is displayed in the name window 302 from storage. Clicking the new button 318 will clear both the name window 302 and the edit window 306 in preparation for the creation of a new electronic mail signature fragment 214. A more detailed discussion of creating and saving an electronic mail signature fragment 214 will be undertaken with respect to FIG. 3A.

After an electronic mail signature fragment 214 has been created, the signature fragment can be identified and stored as a default signature for new electronic mail messages, and a signature fragment for use with reply electronic mail messages. The same signature fragment 214 may be used for both, or a unique signature fragment may be used for new electronic mail messages and another for reply electronic mail messages. Alternately, no default signature fragment 214 may be specified for either new or reply electronic mail messages. The signature creation dialog 300 includes a new message field 310 and a reply message field 312. A user may enter the name of the signature fragment 214 he wishes to serve as the default new message signature fragment in the new message field 310. From that point on, any and all new electronic mail messages will have the electronic mail signature fragment 214 listed in the new message field 310 automatically inserted into the body of the message.

Similarly, an electronic mail signature fragment 214 may be chosen to serve as the default reply message signature fragment. As with the new message field 310, the name of the desired signature fragment 214 is entered in the reply message field 312. This signature fragment will then be automatically inserted into the body of any reply electronic mail messages. The names of the default new message signature fragment and the default reply message signature fragment can be stored in the registry of Microsoft's "WINDOWS" operating system as registry keys. The concept of registry keys is well known to those skilled in the pertinent art. This allows other application programs or alternate electronic mail creation programs to easily and quickly access the desired signature fragments for inclusion with electronic mail messages created by means other than the present invention. It should be noted, however, that this storage is a matter of convenience rather than necessity. The name and body of the electronic mail signature fragments 214 may be stored in many alternate ways, some of which have already been discussed.

Figure 3A:
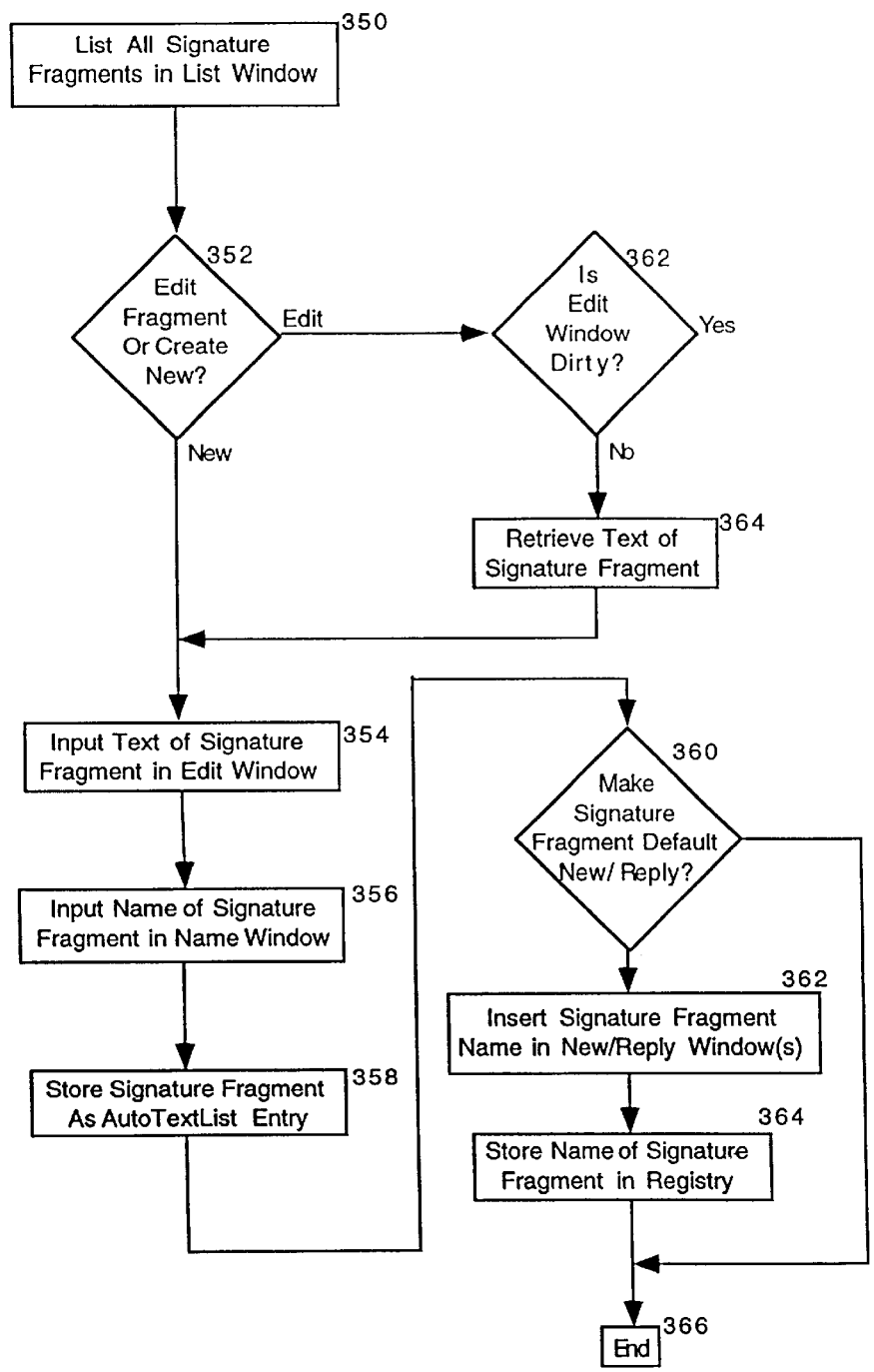
FIG. 3A is a flowchart illustrating a method for creating an electronic mail signature fragment and designating a default new or reply signature fragment, in accordance with an exemplary embodiment of the present invention.

FIG. 3A shows a flowchart depicting the steps involved in creating and storing electronic mail signature fragments 214 through the use of an exemplary electronic mail signature dialog 300 as well as designating signature fragments as default "NEW" or "REPLY" signature fragments. In step 350, a list of all currently created and stored electronic mail signature fragments 214 is displayed in the list window 304.

In step 352, a decision is made whether to edit an existing, stored electronic mail signature fragment 214 or to create a new fragment. A user can choose an existing electronic mail signature fragment by selecting a signature fragment 214 from the list of available signature fragments displayed in the list window 304. The desired selection is typically indicated through the use of an input device, such as a keyboard 40 or mouse 42. For example, a user can position a mouse cursor over the signature fragment 214 desired and depresses a mouse button. Alternately, a user may type the name of the desired signature fragment 214 in the name window 302. In this case, the list of signature fragments 214 in the list window 304 is automatically scrolled to the closest matching name, if it exists. Thus, it can be seen that multiple input devices, including a mouse 42 or a keyboard 40, may be used to select a stored signature fragment 214 for editing. These examples are provided by way of illustration and not limitation; other possible input devices will occur to those skilled in the art.

Choosing an existing electronic mail signature fragment 214 invokes step 362. In step 362, a check is made to determine whether the editing window 306 contains text. If so, the editing window 306 is considered "dirty" and the text of the signature fragment 214 is not retrieved. This way, any unsaved signature fragments 214 listed in the editing window 306 are not lost. In the event that the editing window 306 is dirty, then step 354 is accessed, and the text of the electronic mail message 212 is entered.

If, however, the editing window 306 contains no text, then step 364 is entered. In step 364, the text of the signature fragment 214 chosen for editing is retrieved. This text is displayed in the editing window 306, while the name of the signature fragment is displayed in the name window 302. Once a user has chosen a signature fragment 214 from the list window 304 for editing, a user may then add, delete, or modify text as desired. In addition to displaying the text of the signature fragment 214 in the editing window 306, the name assigned to the chosen signature fragment is displayed in the name window 302. Once the electronic mail signature fragment 214 is sufficiently edited, step 354 is entered.

Alternately, the decision may be made in step 352 to create a new electronic mail signature fragment 214. If so, then in step 354 the text of the signature fragment 214 is inputted in editing window 306. This text may be formatted as desired through the use of editing toolbar 308. Editing options include, but are not limited to, changing the font, size, justification, color, and style of the signature fragment 214. The editing toolbar 308 is also available for use with a previously stored electronic mail signature fragment 214 that has been selected for editing, as described above.

Once the electronic mail signature fragment 214 has been created or edited in step 354, a name is assigned in step 356 to the signature fragment. The name of the signature fragment is inputted into the name window 302. This is the name by which the signature fragment 214 is stored, and later displayed as part of a list of available signature fragments as described with respect to step 350.

Next, in step 358 the signature fragment 214 is stored for later use and retrieval. Typically, storage of an electronic mail signature fragment is initiated through use of the save button 314. Clicking the save button 314 adds the contents of the edit window 306 as an AutoText entry of the E-mail Signature type to the Normal.DOT template, indexed according to the name of the electronic mail signature fragment 214 typed in the name window 302. Alternately, if the name assigned to the signature fragment 214 in the name window 302 already exists, the text of the designated signature fragment 214 is replaced in step 358 with the contents of the edit window 306. Storing the signature fragment in step 358 allows for later insertion into the body of an electronic mail message 200. (The process of inserting an electronic mail signature fragment 214 into an electronic mail message 200 is discussed in conjunction with FIG. 4.) The electronic mail signature fragment 214 is stored in some form of non-volatile long-term storage, such as a hard disk drive 27, a removable disk 29, a CD-ROM disk 31, and so on. An exemplary embodiment stores the signature fragment 214 as a portion of formatted text characters known as an AutoText entry. An AutoText entry is saved to a hard disk drive 27 as a portion of an AutoTextList. The AutoTextList, in turn, is stored in a template file designated as Normal.DOT. Both the AutoTextList and Normal.DOT concepts are known to those skilled in the art; however, a brief discussion of these concepts may aid in comprehension of the actions detailed in the flowchart of FIG. 3A.

An AutoText entry is a fragment of text or graphics stored in a specific location; each AutoText entry may be repeatedly used in the same or multiple documents. Common examples of AutoText entries include date fields, a distribution list for a memorandum, or a standard contract clause. In an exemplary embodiment, AutoText entries are stored as part of an AutoTextList in the Normal.DOT template file. Each AutoText entry is assigned a unique name, and is also associated with a style field. The AutoTextList can be used to store electronic mail signature fragments 214 as AutoText entries. Each signature fragment comprises a separate AutoText entry. Further, each signature fragment 214 is of the "electronic mail signature" style field. AutoText entries in the AutoTextList are separated by style delimiters, which mark the boundary of each text fragment comprising the AutoText entry.

The Normal.DOT template is the basis for all documents created by Microsoft's "WORD" application. AutoText entries stored in the Normal.DOT template file are accessible by any document created by or edited with the WORD application, and other application programs that employ the Normal.DOT template. An exemplary embodiment leverages this universal access capability in order to allow a wide variety of application programs the ability to import, retrieve, and manipulate electronic mail signature fragments 214 created, edited, and stored by an exemplary embodiment. It will be apparent to those skilled in the art that other means for storing and retrieving signature fragments 214 exist, including: storing each signature fragment as a separate file; generating a database file incorporating every signature fragment; generating a list of all signature fragment names, each name cross-indexed to an entry on a second list which corresponds to the text of the signature fragment 214; and others too numerous to mention. These and other methods of storage and retrieval that may occur to those skilled in the art are embraced by the scope of this specification.

Returning to the flowchart depicted in FIG. 3A, after storage of a signature fragment 214 is initiated in step 358, step 360 is entered. In step 360, a decision is made whether the stored signature fragment should be made the default electronic mail signature fragment for all messages.

This decision is communicated to a user through a prompt. If a user chooses to do so, then step 366 is accessed. If the stored signature fragment 214 is not made the default signature fragment for all messages, then end state 370 is entered.

In step 362, the name of the stored signature fragment 214 is inserted in both the new message window 310 and the reply message window 312. Next, in step 364 the name of the chosen signature fragment 214 is stored in the registry of Microsoft's "WINDOWS" operating system as two keys: one for the default new electronic mail signature fragment; and one for the default reply electronic mail signature fragment. Once these keys are created (or updated), future new electronic mail messages will have the signature fragment 214 whose name is stored under the "new" key automatically inserted. Similarly, future reply electronic mail messages will have the signature fragment 214 whose name is stored under the "reply" key automatically inserted. A more detailed discussion of this process is given with respect to FIG. 6. After the registry keys are created, end state 366 is accessed.

Figure 4:
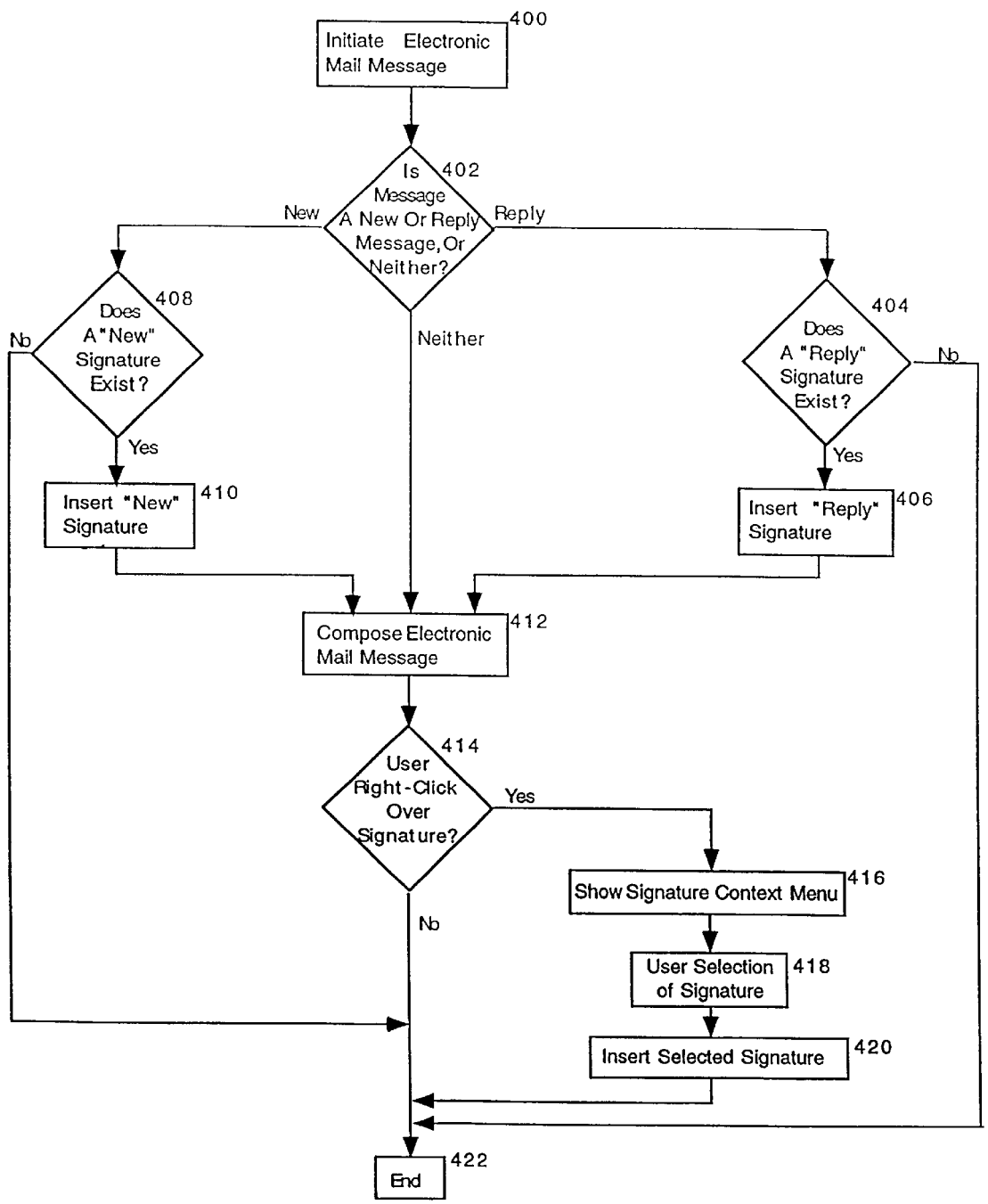
FIG. 4 is a flowchart illustrating a method for entering or changing an electronic mail signature in accordance with an exemplary embodiment of the present invention.

FIG. 4 displays a flowchart detailing the operation of a exemplary embodiment. The operation begins with step 400, in which an electronic mail message is initiated. This initiation may take several forms, of which the most common are creating a new message or replying to a received message.

Once the electronic mail message 212 has been initiated, decision block 402 checks to see if the message is a new message, a reply message, or neither. A new message is a message initiated without reference to a previously existing electronic mail message. A reply message is a message that is initiated in response to the receipt of another electronic mail message, typically by clicking (or otherwise indicating) a "reply" button in an electronic mail program. A third category of electronic mail messages 212, those that are neither a new nor a reply message, exists. An example of such is an electronic mail message initiated in response to a Usenet newsgroup posting; for example, a user may wish to include a copy of an article in an electronic mail to a friend.

In the event that the initiated electronic mail message 212 is neither a new message nor a reply message, then step 412 is entered and the body of the electronic mail message is composed. If it is determined in step 402 that the message is a new message, then decision block 408 is accessed. A determination is made in decision block 408 to inquire whether a signature fragment 214 for use with newly created messages (a "new" signature fragment) exists. If not, then no electronic mail signature fragment is inserted and end step 422 is entered.

If a "new" signature fragment does exist, step 410 is accessed and the electronic mail signature fragment 214 previously designated as the "new" signature fragment by a user is inserted into the electronic mail message 212. As previously mentioned, an exemplary embodiment of the present invention stores both a "new" and a "reply" signature fragment. The "new" signature fragment 214 is retrieved from storage and copied into the electronic mail message 212 at its close. This allows a user to have a standard electronic mail signature fragment 214 used for all electronic mail messages initiated by the user, without requiring the user to either retype or manually copy the signature fragment into each message. Once the "new" signature fragment is inserted in step 410, the electronic mail message 212 is composed in step 412.

Alternately, it may be determined in decision block 402 that the electronic mail message 212 initiated in step 400 is a reply message. If the message is a reply message, then a check is made in step 404 to determine if a "reply" signature fragment 214 exists. If no "reply" signature has been created, then no electronic mail signature is inserted and end step 422 is entered.

If a reply signature fragment 214 exists, then step 406 is entered, where the "reply" signature fragment is inserted into the electronic mail message. As with the "new" signature fragment, an exemplary embodiment stores the "reply" signature fragment in a specific location, such as the "WINDOWS" operating system's registry. This "reply" signature fragment 214 is then accessed and copied into the electronic mail message 212 at the close of the message.

After either the "new" or "reply" signatures fragments 214 are inserted into the electronic mail message 212, the message is composed in step 412. A message is typically composed through the entry of alphanumeric characters with a computer keyboard 40; however, alternatives exist. An electronic mail message 212 may also be composed with other input devices, including a mouse 42, a light pen, voice dictation software, and alternatives, too numerous to mention individually, that will readily occur to those skilled in the art. This listing should be understood to be by way of example and not by limitation, and equivalent means of composing an electronic mail message may be used without departing from the spirit or letter of the specification and claims.

During or after the composition of the electronic mail message 212, inputs are monitored in step 414 to determine if a predetermined user input is initiated. This predetermined user input may be of any type, so long as it is reasonably specific and the method recognizes it. That is, the user input needs to be sufficiently unique that it does not interfere with the other functions of the method, but instead denotes the specific desire of a user to invoke steps 416 through 420. For example, a right-click from a multi-button mouse, initiated while the mouse cursor is placed over the electronic mail signature, could comprise such a predetermined user input.

The occurrence of the predetermined user input leads to step 416, in which a signature context menu of all electronic mail signatures is shown. This signature context menu is typically shown via a popup menu, as described with respect to FIG. 6. The list contains all user-created electronic mail signatures. Preferably, the option to edit the currently inserted electronic mail signature and the option to create a new electronic mail signature are also included, but are not essential.

Once this list is shown, a user selection of one of the options in the signature context list is made in step 418. If a user chooses to edit the current signature or create a new signature, then the editing dialog is opened. This dialog is described above in reference to FIG. 3, and therefore is not shown on the flowchart embodied in FIG. 4.

When an electronic mail signature is selected from the signature context list, the selected signature is inserted into the body of the electronic mail message in step 420. This is accomplished by searching the electronic mail message for predetermined style delimiters. When the predetermined style delimiters are found, all text between the first style delimiter and the second style delimiter is replaced with the selected electronic mail signature. Once step 420 is complete, an end state is entered in step 422.

Figure 5:
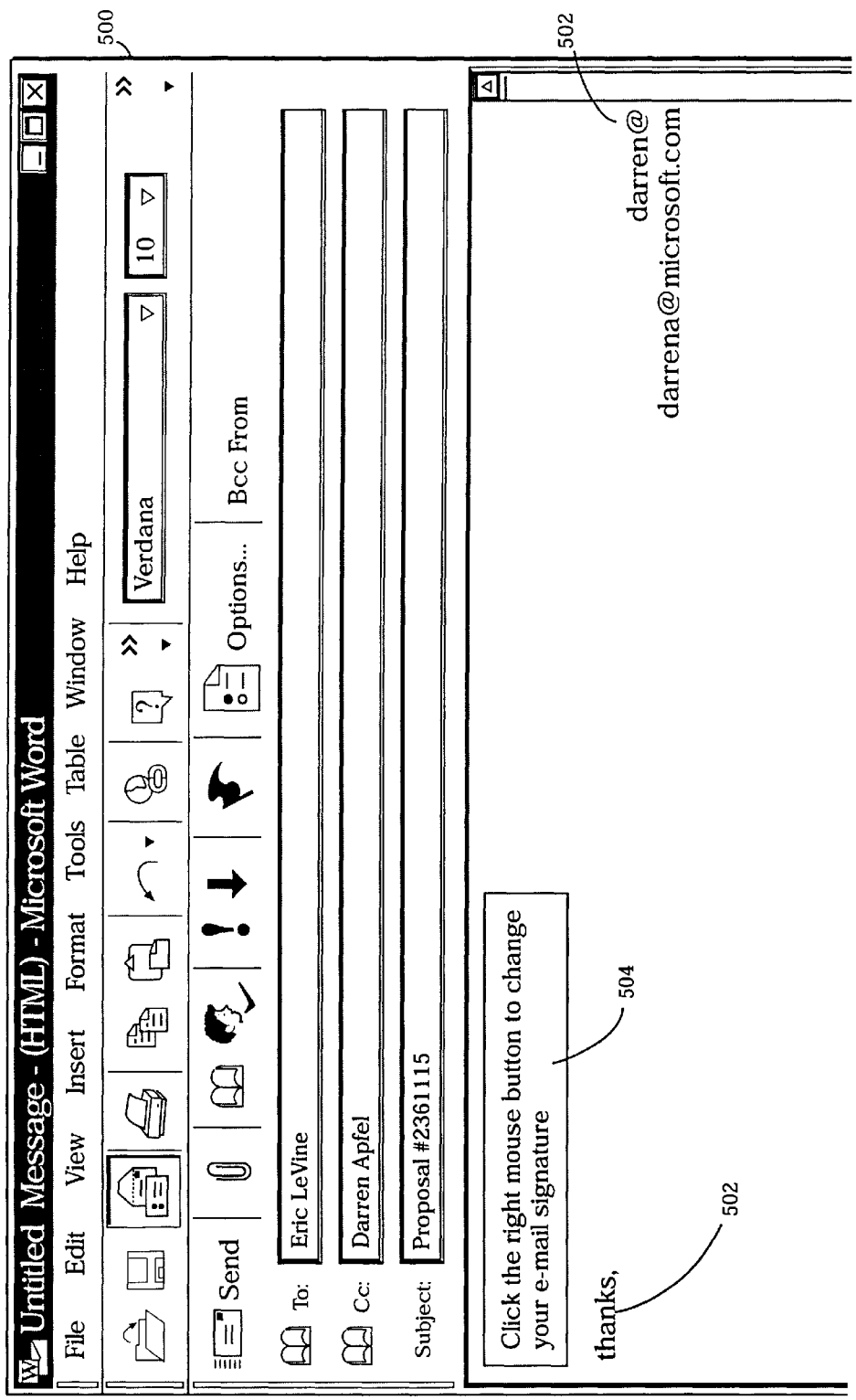
FIG. 5 is a screen display illustrating the creation of an electronic mail message in accordance with an exemplary embodiment of the present invention.

FIG. 5 is a display screen of an exemplary embodiment of the present invention, depicting the creation of a new electronic mail message 212 as detailed in the flowchart of FIG. 4. The electronic mail message 212 is created in an exemplary electronic mail creation application window 500, which is an aspect of an exemplary embodiment. The particulars of creating an electronic mail message have been discussed with respect to FIG. 2. Instead, this discussion will focus upon the automatic insertion of an electronic mail signature fragment 214, as performed by the exemplary embodiment shown in FIG. 5.

When a user initiates the creation of an electronic mail message 212 through the use of the exemplary embodiment, a default electronic mail signature fragment 502 is automatically inserted into the body of the electronic mail message 212. The exemplary embodiment determines if the electronic mail message 212 is a new message, or a reply message. The proper default electronic mail signature fragment 502 is then inserted into the body of the message. Since the exemplary embodiment stores the name of the default new and default reply electronic mail signature fragments in the WINDOWS registry as registry keys, these registry keys may be easily retrieved in order to determine the name of the proper signature fragment to be inserted. Once the proper signature fragment 214 is determined from the registry key, the text comprising the electronic mail signature fragment 214 is retrieved from the AutoTextList, wherein it is stored as an AutoText entry (as discussed with respect to FIGS. 3 and 4.) This text is inserted with a specific style field, namely the "Email Signature" style. Insertion of text within a style field, including a marker indicating the beginning of a style field and a marker indicating the end of a style field, allows the exemplary embodiment to easily replace a default electronic mail signature fragment 502. The process of replacing a default electronic mail signature fragment will be discussed in connection with FIG. 7. Further, an exemplary embodiment inserts a blank line immediately preceding the signature fragment 214 in order to differentiate it from the body of the electronic mail message 212.

The exemplary embodiment also prompts a user that he or she may change the default signature through the use of a tool tip 504. As a cursor moves across the exemplary electronic mail creation application window 500, an exemplary embodiment continuously polls to determine what fields over which the cursor is positioned. When a poll query is returned with an indication that the cursor hovers over an Email Signature style field, an exemplary embodiment displays a context-sensitive help feature. This feature is colloquially referred to as a "tool tip" 504. In an exemplary embodiment, the tool tip 504 typically reads "Click the right mouse button to change your e-mail signature." This alerts the user that initiating the proper user input will allow him or her to access the signature context menu. If the cursor is moved beyond the bounds of the Email Signature style field, then the tool tip 504 is removed from the display screen 47. Initiating the user input stated by the tool tip 504 pulls up a popup menu, referred to as the "signature context menu."

Figure 6:
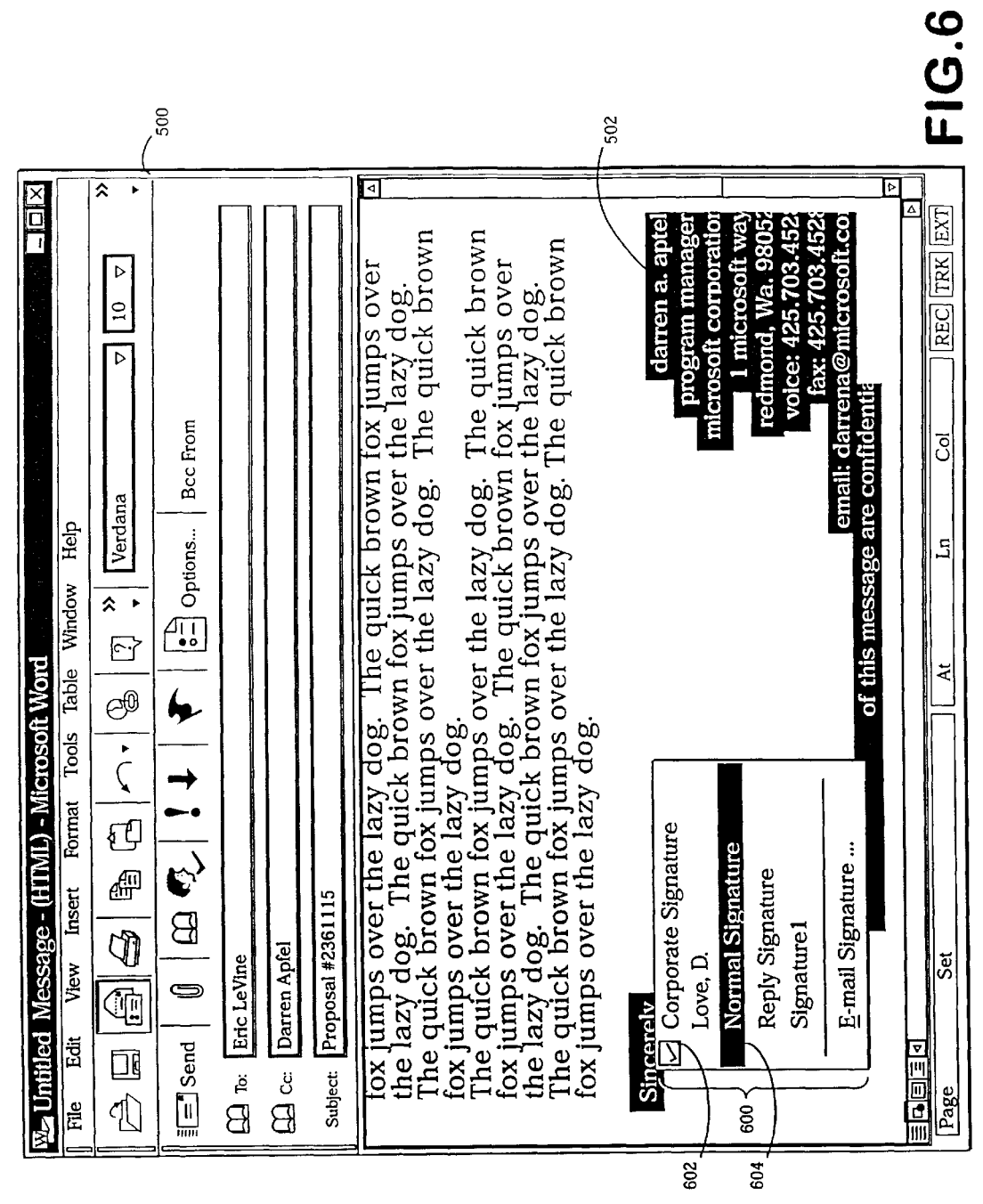

Turning now to FIG. 6, the use of the signature context menu will be discussed. (The signature context menu was discussed generally with respect to steps 416–420 of FIG. 4.) As mentioned in the discussion of FIG. 5, an exemplary embodiment includes a signature context menu 600. The signature context menu 600 is typically accessed by initiating a predetermined user input while an cursor hovers over the default electronic mail signature fragment 214. In the exemplary embodiment, the signature context menu 600 is accessed by depressing the right button of a mouse 42. When this occurs, two changes are effected. First, the default electronic mail signature fragment 502 is highlighted. This indicates to the user exactly what the extent of any changes to a signature fragment will be. Second, the signature context menu 600 is displayed within the exemplary electronic mail message creation application window 500.

The signature context menu 600 displays a list of all electronic mail signature fragments 214 stored by an exemplary embodiment. The currently inserted signature fragment is indicated through the use of a device such as a check mark 602. A user may choose any of the displayed electronic mail signature fragments 214 to replace the default signature fragment 502. In an exemplary embodiment, the selection with which the default signature fragment 502 will be replaced is indicated through the use of a highlight bar 604. The combination of the check mark 602 and the highlight bar 604 allow a user to determine exactly which signature fragment 214 is currently inserted, and which signature fragment will replace it. An exemplary embodiment may also include an option to edit a signature fragment 214, create a new signature fragment, or otherwise access options dealing with signature fragments such as formatting.

Once a replacement electronic mail signature fragment 214 is chosen, the default signature fragment 502 is removed from the message and the replacement is inserted. This allows the replacement of electronic mail signature fragments 214 while composing an electronic mail message 212 without forcing a user to delete an undesired signature fragment and retype a new one. This removal and insertion is performed by determining the beginning and end of the Email Signature style field within which the default signature fragment 214 is contained and displayed. All text between the beginning of the style field and the end of the style field is removed, and replaced with the signature fragment chosen from the signature context menu 600. The chosen signature fragment is retrieved from the AutoTextList, where it was stored as discussed with reference to FIG. 3.

Figure 7:
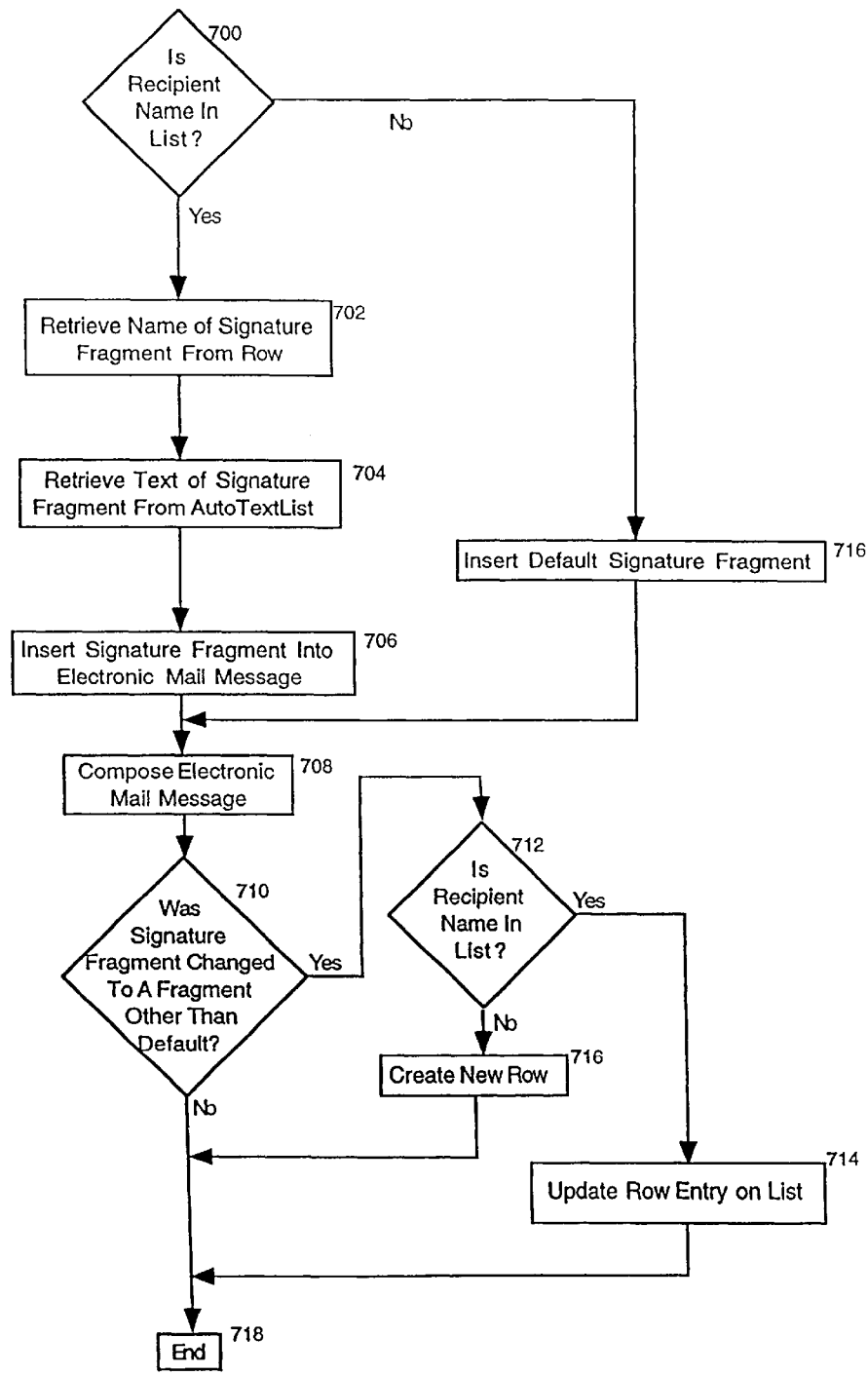
FIG. 7 is a flowchart illustrating a method for inserting and associating a signature fragment with a specific recipient in accordance with an exemplary embodiment of the present invention.

Turning now to FIG. 7, the association of custom electronic mail signature fragments 214 with specific electronic mail recipients will be discussed. That is, each recipient of electronic mail sent through the use of an exemplary embodiment may have a custom signature fragment 214 associated with him or her. This allows a user of an exemplary embodiment to specify more than simply a default new message signature fragment and a default reply message signature fragment, thus leading to increased flexibility.

Generally, a list of all recipients of electronic mail messages 212 is maintained. Further, this list contains the electronic signature fragment 214 used in the electronic mail message 214 sent to that recipient. A typical list is thus comprised of rows, which in turn have two entries per row: a recipient name (or other unique identifier) and the signature fragment associated with that recipient.

In step 700, when an electronic mail message 214 is composed and a recipient selected in the "TO" field 204, the name of the recipient is checked against the stored list of recipients. If a match is found, then step 702 is accessed. In step 702, the name of the electronic mail signature fragment 214 associated with the recipient of the electronic mail message 212 is retrieved from a row of the list of recipients. Once the associated signature fragment is known, step 704 is entered.

In step 704, the data of the associated electronic mail signature fragment 214 is retrieved from storage. In the exemplary embodiment shown in FIG. 6, the text of the associated signature fragment is stored in the AutoTextList within the Normal.DOT template. The concepts of the AutoTextList and Normal.DOT template are more fully detailed in the discussion of FIGS. 3A and 5.

Following step 704, the retrieved data of the electronic mail signature fragment 214 is inserted into the electronic mail message at a predetermined location in step 706. Typically, the signature fragment 214 is inserted at the close of the electronic mail message 212, although this is not necessary. As part of the insertion process, the data is inserted with a specific delimiter marking the beginning of the data field, and another delimiter marking the end of the data field. These delimiters allow the signature fragment 214 to be easily replaced according to the wishes of the user. The replacement of signature fragments is more fully detailed in the discussion of steps 416–420 of FIG. 4.

Alternately, the recipient name may not appear in the list of recipients. If so, then step 716 is accessed after this determination is made in step 700. In step 716, the default electronic mail signature fragment 502 is inserted. Whether the "new" signature fragment 214 or the "reply" signature fragment is inserted is determined from the context of the electronic mail message, as discussed in conjunction with FIG. 4.

After either the associated signature fragment 214 or the default signature fragment 502 is inserted into the electronic mail message 212, the electronic mail message is composed in step 708. A message is typically composed through the entry of alphanumeric characters with a computer keyboard 40; however, alternatives exist. An electronic mail message 212 may also be composed with other input devices, including a mouse 42, a light pen, voice dictation software, and alternatives, too numerous to mention individually, that will readily occur to those skilled in the art. This listing should be understood to be by way of example and not by limitation, and equivalent means of composing an electronic mail message may be used without departing from the spirit or letter of the specification and claims.

Following composition of the electronic mail message 212 in step 708, it is determined in step 710 whether the electronic mail signature fragment 214 was changed from the default or associated signature fragment during composition of the message.

If it is determined in step 710 that the associated signature fragment for the recipient is changed (through the use of the signature context menu, for example), then step 712 is entered. In step 712, a second determination is made as to whether the recipient name is entered on the list of recipients. If the entry does exist, then in step 714 the row corresponding to the unique identifier of the recipient will be updated to include the newly selected signature fragment 214. This allows a user of an exemplary embodiment to easily and efficiently change the signature fragment associated with a recipient, thus ensuring that the user does not have to constantly replace an outdated signature fragment in every message addressed to a recipient. A row will only be updated if there is a single recipient listed in the "TO" field 204. No entries for any recipients listed in the "CC" field 206 will be changed. After the row is created, end step 718 is accessed.

If, however, it is determined that an entry corresponding to the recipient of an electronic mail message 212 is not present on the list of recipients, then a new row will be entered on the list of recipients in step 716. This new row will contain the new recipient's name, along with the associated electronic signature fragment 214 for that recipient. Thus, any electronic mail messages 212 sent to that recipient in the future will have the associated electronic mail signature fragment 214 inserted. After this is completed, end step 718 is entered.

Alternately, it may be determined in step 710 that no change was made to the inserted electronic mail signature fragment 214. In this case, no updating or maintenance of the list of recipients is necessary, and end state 718 is entered.

For practical purposes, the length of the list of recipients will be limited. Imposing an upper limit on the number of rows comprising the list of recipients ensures that the list of recipients will be quickly searchable and will not consume an undue amount of a computer's resources. To that end, once a list grows beyond a set number of rows, the last row in the list of recipients will be automatically pruned. To ensure that this automatic pruning does not remove an important or recently used entry, rows move up and down the list as accessed by an exemplary embodiment. Every time that a row is accessed to store or retrieve information, that row will be moved to the top of the list of recipients. In this way, the rows corresponding to the most recent recipients will be safe from the automatic pruning capability of an exemplary embodiment. Further, if a recipient appearing on the list of recipients has his associated electronic mail signature fragment 214 changed to either the default new or default reply signature fragments, that recipient will be pruned from the list. A recipient who has the default signature fragment 214 associated with him would have the same signature fragment inserted regardless of whether his information was stored on the list of recipients. Because of this, removing such a recipient from the list of recipients conserves storage space and resources.

From the foregoing description, it will be appreciated that the present invention supports the insertion of an electronic mail signature fragment within an electronic mail message based on the context of that message or the recipient for that message. Specifically, an exemplary embodiment allows a user to: create multiple electronic mail signature fragments, store these signature fragments; designate a signature fragment for use with newly generated electronic mail messages and one for use with electronic mail messages generated in reply to another such message; and automatically insert the proper default electronic mail signature fragment into an electronic mail message. Further, an exemplary embodiment can keep track of electronic mail message recipients, associate the signature fragment used in the electronic mail message sent to that recipient with the recipient, and automatically insert the associated signature fragment into all electronic mail messages sent to that recipient. As a result, the user may easily store and index multiple electronic mail signatures, with the added benefit that electronic mail signatures may be quickly and efficiently changed without forcing a user to retype text.

The invention may conveniently be implemented in one or more program modules that are based upon the features illustrated in FIGS. 2–7 and the representative operating environment shown in FIG. 1. No particular programming language has been described for carrying out the various procedures described above because it is considered that the operations, steps, and procedures described above and illustrated in the accompanying drawings are sufficiently disclosed to permit one of ordinary skill in the art to practice an exemplary embodiment. Moreover, there are many computers and operating systems which may be used in practicing an exemplary embodiment and therefore no detailed computer program could be provided which would be applicable to all of these many different systems. Each user of a particular computer will be aware of the language and tools which are most useful for that user's needs and purposes.

Alternative embodiments will become apparent to those skilled in the art to which an exemplary embodiment pertains without departing from its spirit and scope. Accordingly, the scope of an exemplary embodiment is defined by the appended claims rather than the foregoing description.

We claim:

1. A method for inserting one of a plurality of electronic mail signature fragments into an electronic mail message, comprising the steps:

identifying a context of the electronic mail message;

selecting one of the plurality of signature fragments based on the context of the electronic mail message; and inserting a selected electronic mail signature fragment into a body portion of the electronic mail message.

2. The method of claim 1, wherein the plurality of signature fragments comprise reply signature fragments representing an electronic mail signature for a reply-type message and new signature fragments representing an electronic mail signature for an original message.

3. The method of claim 2, wherein the step of selecting one of the plurality of signature fragments comprises:

selecting one of the reply signature fragments in response to identifying the electronic mail message as complying with one or more requirements of the reply-type message; and selecting one of the new signature fragments in response to identifying the electronic mail message as complying with one or more requirements of the original message.

4. The method of claim 1, wherein the step of inserting the selected signature fragment into the electronic mail message comprises:

locating a beginning of a style field in the electronic mail message;

locating an end of the style field in the electronic mail message;

retrieving the selected signature fragment from a storage mechanism that maintains the plurality of signature fragments; and inserting the selected signature fragment between the beginning and end of the style field.

5. The method of claim 4, wherein the style field comprises an Electronic Mail Signature field located within a closing portion of the body portion of the electronic mail message.

6. The method of claim 5, wherein the step of retrieving the signature fragment comprises:

searching a text fragments list comprising a plurality of text fragments to determine whether one of the text fragments is associated with the selected signature fragment; and in the event that one of the text fragments is associated with the selected signature fragment, then retrieving the text fragment from the text fragments list for insertion as the selected signature fragment within the electronic mail message.

7. The method of claim 6, wherein the text fragments list comprises an AutoTextList generated by a word processing program, each text fragment sorted by a style and a unique identifier corresponding to one of the signature fragments.

8. A method for editing an electronic mail message comprising a message body and a default signature fragment located at a predetermined location within a closing of the message body, comprising the steps:

displaying the electronic mail message on a display screen;

in response to receiving a first input signal, presenting a plurality of electronic mail signature fragments as possible replacement candidates for the default signature fragment;

in response to a second input signal, selecting one of the signature fragments for insertion within the electronic mail message; and replacing the default signature fragment with the selected signature fragment by inserting the selected signature fragment into the predetermined location of the electronic mail message;

displaying a prompt when a position indicator is positioned proximate to the default signature fragment, the prompt providing an indication that the default signature fragment can be replaced with another signature fragment in response to initiating a predefined user event.

9. The method of claim 8, wherein the first input signal comprises a down indication signal issued by a pointing device in response to depressing a pointing device button when a position indicator is positioned over the default signature fragment on the display screen.

10. The method of claim 8, wherein the default signature fragment is automatically inserted into the electronic mail message based on a context, identifying characteristic or recipient of the electronic mail message.

11. The method of claim 10, wherein the default signature fragment is automatically inserted into the electronic mail message based on whether the electronic mail message is an original electronic mail message or a reply-type electronic mail message.

12. A computer-readable medium on which is stored a program module for inserting one of a plurality of electronic mail signature fragments into an electronic mail message, the program module comprising instructions which, when executed by a computer, perform the steps of:

identifying a context of the electronic mail message by determining whether the electronic mail message comprises a reply-type message or an original message;

in the event that the electronic mail message comprises the reply-type message, selecting one of a plurality of reply signature fragments representing an electronic mail signature for the reply-type message;

in the event that the electronic mail message comprises the original-type message, selecting one of a plurality of new signature fragments representing an electronic mail signature for the original message; and inserting the selected one of the reply signature fragments or the new signature fragments into the electronic mail message, without manual intervention, thereby adding an inserted electronic mail signature to the electronic mail message.

13. The computer-readable medium of claim 12, wherein the step of inserting the selected one of the reply signature fragment or the new signature fragment into the electronic mail message comprises:

locating a beginning of an Electronic Mail Signature style field in the electronic mail message;

locating an end of the Electronic Mail Signature style field in the electronic mail message;

retrieving the selected one of the reply signature fragment or the new signature fragment from a storage mechanism that maintains the plurality of signature fragments; and inserting the selected one of the reply signature fragment or the new signature fragment between the beginning and end of the style field.

14. The computer medium of claim 13, further comprising instructions which, when performed by the computer, comprise the steps:

determining a position of a position indicator displayed by a display screen of the computer;

in the event that the position indicator is positioned proximate to the inserted electronic mail signature, then displaying a prompt providing an indication that the inserted electronic mail signature can be replaced with another one of the signature fragments in response to initiating a predefined user event.

15. The computer medium of claim 14 further comprising instructions which, when performed by the computer, comprise the steps:

receiving an input signal representing the predefined user event;

displaying a signature context list comprising the plurality of electronic mail signature fragments, each signature fragment available as a replacement candidate to replace the inserted electronic mail signature within the electronic mail message.

16. The computer medium of claim 15 further comprising instructions which, when performed by the computer, comprise the steps:

selecting one of the electronic mail signature fragments from the signature context list in response to receiving another input signal;

replacing the inserted electronic mail signature with the selected electronic mail signature fragment in the electronic mail message.

17. A method for inserting one of a plurality of data candidates into a body portion of an electronic mail message, comprising the steps:

automatically identifying a context of the electronic mail message;

automatically selecting one of the plurality of data candidates based on an identifying characteristic of the electronic mail message;

automatically inserting the selected data candidate within the electronic mail message;

wherein the identifying characteristic comprises whether the electronic mail message is an original electronic mail message, whether the electronic mail message is a reply-type electronic mail message, or a recipient of the electronic mail message.

18. The method of claim 17, wherein the data candidates comprise electronic mail signature fragments.

19. The method of claim 17, wherein the identifying characteristic comprises the recipient of the electronic mail message.

20. A method for inserting one of a plurality of electronic mail signature fragments into an electronic mail message, comprising the steps:

identifying a recipient designated to receive the electronic mail message;

selecting one of the plurality of signature fragments based on an identity of the designated recipient of the electronic mail message; and inserting a selected electronic mail signature fragment into a body portion of the electronic mail message.

21. The method of claim 20, wherein the step of selecting one of the plurality of signature fragments based upon the identity of the recipient comprises:

searching an association list comprising a plurality of entries representing recipient candidates for the electronic mail message to determine whether the association list contains an entry corresponding to the designated recipient, each entry of the association list comprising an identity of one of the recipient candidates and corresponding to one of the signature fragments;

in the event that the association list contains the entry corresponding to the designated recipient, then selecting the signature fragment corresponding to the entry for insertion within the electronic mail message.

22. The method of claim 21, wherein each entry in the association list comprises a row having a first entry representing a unique identifier for one of the recipient candidates and a second entry representing one of the signature fragments associated with the recipient candidate.

* * * * *